United States Patent
Amarendran et al.

(10) Patent No.: US 8,799,245 B2
(45) Date of Patent: *Aug. 5, 2014

(54) AUTOMATED, TIERED DATA RETENTION

(71) Applicant: CommVault Systems, Inc., Oceanport, NJ (US)

(72) Inventors: Arun Prasad Amarendran, Eatontown, NJ (US); Tirthankar Chatterjee, Tinton Falls, NJ (US); Prakash Varadharajan, Manalapan, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,404

(22) Filed: Mar. 6, 2013

(65) Prior Publication Data
US 2013/0238575 A1 Sep. 12, 2013

Related U.S. Application Data

(60) Provisional application No. 61/608,531, filed on Mar. 8, 2012.

(51) Int. Cl.
G06F 17/00 (2006.01)
G06F 7/00 (2006.01)

(52) U.S. Cl.
USPC .......................................... 707/694; 707/812

(58) Field of Classification Search
CPC ............ G06F 11/1461; G06F 11/1466; G06F 17/30221; G06F 17/30073
USPC ....................................................... 707/694
See application file for complete search history.

(56) References Cited

U.S. PATENT DOCUMENTS

| | | | |
|---|---|---|---|
| 7,523,149 B1 * | 4/2009 | Sridharan et al. ...... | 707/999.102 |
| 7,680,830 B1 * | 3/2010 | Ohr et al. .................. | 707/999.2 |
| 7,877,362 B2 | 1/2011 | Gokhale et al. | |
| 8,527,468 B1 * | 9/2013 | Crafford et al. ............... | 707/662 |
| 2005/0171979 A1 * | 8/2005 | Stager et al. ................. | 707/200 |
| 2006/0064555 A1 * | 3/2006 | Prahlad et al. ................ | 711/154 |
| 2007/0179995 A1 | 8/2007 | Prahlad et al. | |
| 2007/0208788 A1 * | 9/2007 | Chakravarty et al. ......... | 707/204 |
| 2007/0255770 A1 * | 11/2007 | Murase ......................... | 707/205 |
| 2007/0260640 A1 * | 11/2007 | Hamilton et al. ............. | 707/200 |
| 2008/0228785 A1 * | 9/2008 | Kavuri et al. ................. | 707/100 |
| 2010/0094809 A1 * | 4/2010 | Consul et al. ................. | 707/662 |
| 2010/0250549 A1 * | 9/2010 | Muller et al. ................. | 707/741 |
| 2010/0332479 A1 | 12/2010 | Prahlad et al. | |
| 2010/0332561 A1 * | 12/2010 | Prahlad et al. ................ | 707/812 |
| 2012/0030171 A1 | 2/2012 | Kottomtharayil | |
| 2013/0238563 A1 | 9/2013 | Amarendran et al. | |

FOREIGN PATENT DOCUMENTS

WO WO 2010/036754 A1 4/2010

OTHER PUBLICATIONS

PCT International Search Report and Written Opinion for App No. PCT/US2013/029407, dated Jun. 24, 2013.

\* cited by examiner

*Primary Examiner* — Pavan Mamillapalli
(74) *Attorney, Agent, or Firm* — Knobbe Martens Olson & Bear LLP

(57) ABSTRACT

The automatic, tiered retention storage system according to certain aspects can automatically classify data items based on content, such as based on the inclusion of search terms in the data items, or based on metadata or other characteristics associated with the data. Based on the classification, the system can assign the data items to corresponding user-defined "buckets." In some embodiments, each bucket is associated with a particular tier in the storage system having a specific retention period.

18 Claims, 10 Drawing Sheets

AUTOMATED, TIERED DATA RETENTION

CROSS REFERENCE TO RELATED APPLICATIONS

This application claims the benefit of priority under 35 U.S.C. §119(e) of U.S. Provisional Patent Application No. 61/608,531, filed on Mar. 8, 2012, entitled "AUTOMATED RETENTION POLICY IN A DATA STORAGE SYSTEM," which is incorporated herein by reference in its entirety.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

Enterprises are generating ever increasing volumes of data and corresponding storage requirements. However, different types of data may have varying degrees of importance, and all of the data may not need to be retained according to the same criteria, such as for the same period of time.

Due to the above challenges, there is a need for a data storage system that implements a data retention policy in an efficient manner. In order to address these and other challenges, certain storage systems disclosed herein automatically classify stored data (e.g., backup and/or primary, production data) into a set of pre-defined groups according to a retention scheme. The system can also automatically prune the data based on various retention periods associated with the pre-defined groups. Depending on the configuration, the system classifies the data based on the contents, type, or other characteristics (e.g., metadata) associated with the data.

The automatic, tiered retention storage system according to certain aspects can automatically classify data items based on content, metadata, or any other appropriate characteristic of the data, and assign the data items to corresponding user-defined "buckets." In some embodiments, each bucket is associated with a particular tier in the storage system having a specific retention period. The criteria for classification can be defined according to user-preference. For example, the user may wish to classify files based on content using search terms and/or based on metadata. Files can be classified based on subject matter (e.g., as indicated by content and/or metadata), for example, some other appropriate parameter associated with the files, or any combination thereof. Emails, for instance, may be classified according to subject line content, sender, recipient, message body content, presence, or type of attachment(s), etc. The automatic classification may be implemented as part of a broader storage policy.

A user-defined retention policy can specify the retention periods associated with the buckets, or the retention periods can be automatically assigned, e.g., to a default retention period. After the data is classified according to the criteria in the policy and assigned to the appropriate bucket, it can be copied or otherwise associated with the appropriate bucket (e.g., migrated to an appropriate tier). The data in a particular bucket is kept in the bucket for the specified retention period, and pruned when the retention period is met.

In this manner, the automated, tiered retention data storage system can facilitate management and reduction of data by making classification of data items and their retention in various buckets automatic. The system works as a filter, and allows for efficient migration and/or pruning of data in a meaningful, intelligent manner, according to the needs of the organization. Rather than having to manually extract the data items to retain for a certain period of time, the user can define a retention policy to store the designated items (e.g., all emails associated with a CEO or other employee) for a specified length of time, and the automatic, tiered retention storage system automates the process. In this way, the user or system administrator can save a significant amount of time and effort in managing and reducing the amount of data in an organization.

According to certain embodiments, a method is provided for automatic, tiered data retention in a networked data storage system. The method can include copying primary data comprising a plurality of data items generated by one or more applications executing on one or more client computers from primary storage to secondary storage. The method may further include accessing a user-defined data retention policy comprising a set of criteria for assigning the data items to a plurality of retention containers within the secondary storage, each retention container associated with a particular retention period, the classification criteria for at least a first of the retention containers comprising at least one search term. The method can additionally include using one or more computer processors, parsing through the data items to determine which data items contain an instance of the search term associated with the first retention container. For one or more first data items that contain an instance of the search term associated with the first retention container, the method can include: assigning the first data items to the first retention container at least in part based on the determination that the first data items contain the search term; and pruning the first data items from the first retention container only after the first data items have been retained for a duration that is at least as long as the retention period associated with the first retention container.

In some embodiments, a data storage system is provided for automatic, tiered data retention. The system may include a storage manager module executing in one or more processors and configured to initiate copying of primary data comprising a plurality of data items generated by one or more applications executing on one or more client computers from primary storage to secondary storage. The system may also include a tiered retention module executing in one or more processors. The tiered retention module can be configured to access a user-defined data retention policy comprising a set of criteria for assigning the data items to a plurality of retention containers within the secondary storage, each retention container associated with a particular retention period, the classification criteria for at least a first of the retention containers comprising at least one search term. The tiered retention module may be further configured to parse through the data items to determine which data items contain an instance of the search term associated with the first retention container. The tiered retention module can be further configured to: for one or more first data items that contain an instance of the search term associated with the first retention container: assign the one or more first data items to the first retention container at least in part based on the determination that the one or more first data items contain the search term; detect that the one or more first data items have been retained for a period of time corresponding to the retention period, or at least a period of time corresponding to the retention period, associated with the first retention container; and in response to said detecting, prune the one or more first data items from the first retention container.

According to other aspects of the disclosure, a method is provided for automatic, tiered data retention in a data storage system. The method can include accessing a data retention policy comprising a set of criteria for assigning a plurality of data items stored in a first storage device to a plurality of retention containers, each retention container associated with a particular retention period, the data items generated by at least one user application operating on a first computing device. The method may further include using one or more computer processors, parsing through the data items to determine which data items meet the classification criteria. For one or more first data items of the plurality of data items that meet the classification criteria associated with a first retention container of the plurality of retention containers, the method can include: assigning the one or more first data items to the first retention container at least in part based on the determination that the first data items meet the classification criteria; and pruning the one or more first data items from the first retention container after the first data items have been retained for a duration that is at least as long as the retention period associated with the first retention container. For one or more second data items of the plurality of data items that meet the classification criteria associated with a second retention container of the plurality of retention containers, the method includes assigning the one or more second data items to the second retention container at least in part based on the determination that the second data items meet the classification criteria, and pruning the one or more second data items from the second retention container after the second data items have been retained for a duration that is at least as long as the retention period associated with the second retention container.

According to yet further aspects of the disclosure, a method is provided for automatic, tiered data retention in a networked data storage system. The method can include copying primary data comprising a plurality of files generated by one or more client computers from primary storage to secondary storage. The method may further include accessing a data retention policy including classification criteria associated with each of a plurality of buckets in the secondary storage having corresponding retention periods associated therewith, wherein individual files in the plurality of files belong to a particular bucket of the plurality of buckets if the individual files meet the classification criteria associated with the particular bucket. The method can additionally include using one or more computer processors, automatically processing, based on the data retention policy, a first file of the plurality of files to determine that the first file belongs to a first bucket of the plurality of buckets that is associated with a first retention period. The method can further include using one or more computer processors, automatically processing, based on the data retention policy, the first file of the plurality of files to determine that the first file also belongs to a second bucket of the plurality of buckets that is associated with a second retention period that is longer than the first retention period. The method may additionally include associating a first instance of the first file with the first bucket, and associating a second instance of the first file with the second bucket.

According to other embodiments, a data storage system is provided for automatic, tiered data retention. The system can include a storage manager module executing in one or more processors and configured to initiate copying of primary data comprising a plurality of data items generated by one or more applications executing on one or more client computers from primary storage to secondary storage. The system may further include a tiered retention module executing in one or more processors. The tiered retention module can be configured to access a data retention policy comprising a set of classification rules for classifying the files into a plurality of buckets within the secondary storage, each bucket associated with a particular retention period. The tiered retention module may be further configured to, using one or more computer processors, automatically process, based on the retention policy, a first file of the plurality of files to determine that the first file belongs to a first bucket of the plurality of buckets associated with a first retention period. The tiered retention module can be further configured to, using one or more computer processors, automatically process, based on the retention policy, the first file of the plurality of files to determine that the first file belongs to a second bucket of the plurality of buckets associated with a second retention period that is longer than the first retention period. The tiered retention module may additionally be configured to associate a first instance of the first file with the first bucket, and associate a second instance of the first file with the second bucket.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION

Systems and methods are described herein for implementing automated retention policy in a data storage system. Examples of such systems and methods are discussed in further detail herein, e.g., with respect to FIGS. 2-5. Automated retention policy may be implemented by information management systems such as those that will now be described with respect to FIGS. 1A-1E. And, as will be described, the componentry for implementing automated retention policy described herein can be incorporated into such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
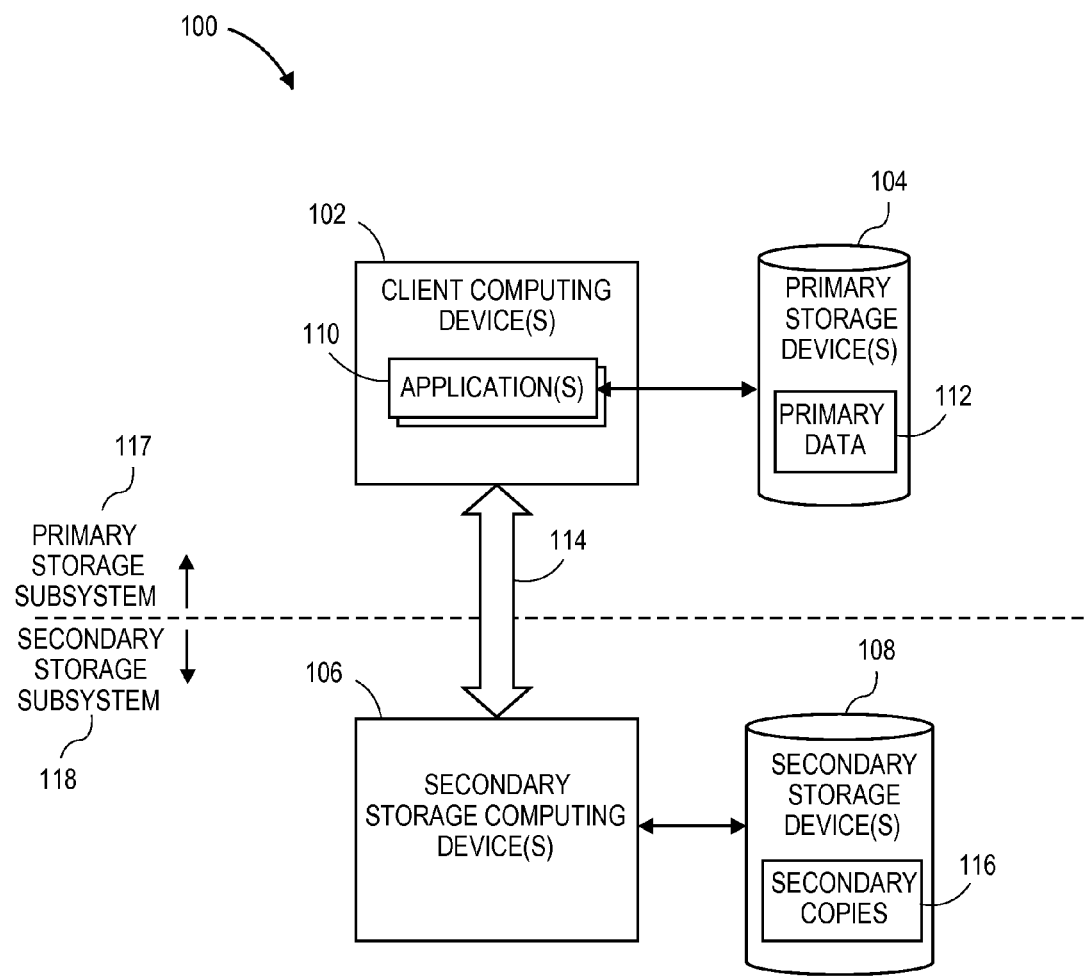
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLS]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPS), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as or information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
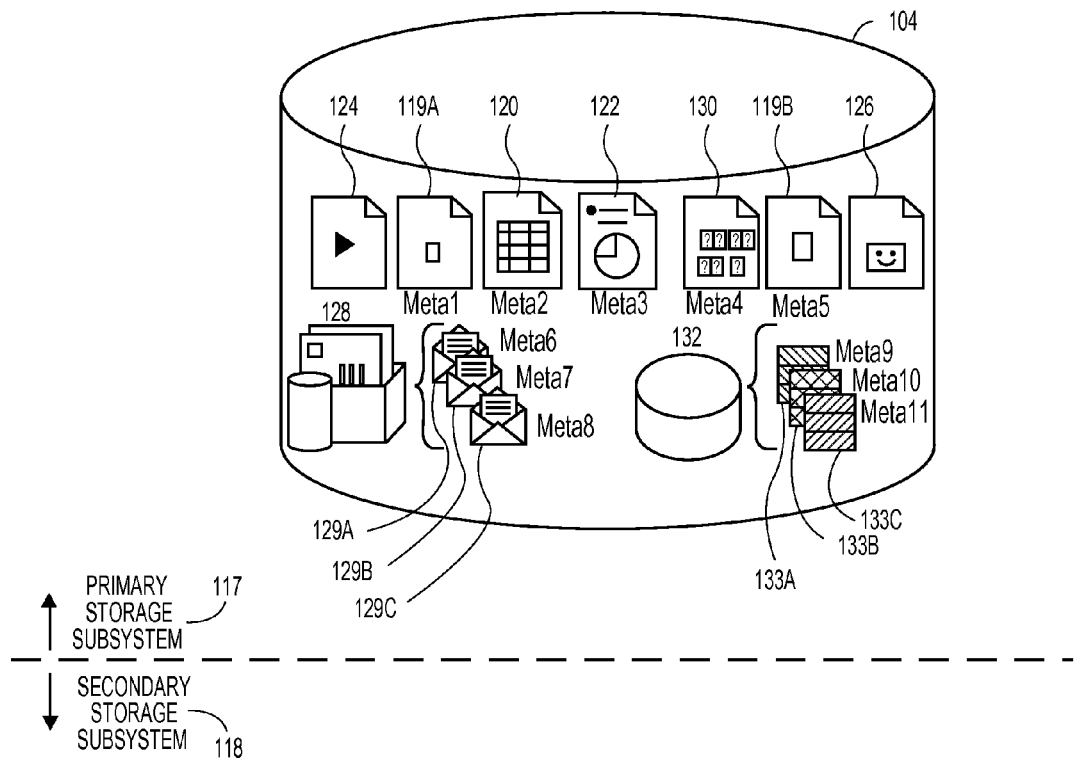
FIG. 1B is a detailed view of a primary storage device, a secondary storage device, and some examples of primary data and secondary copy data.
Figure 1B:
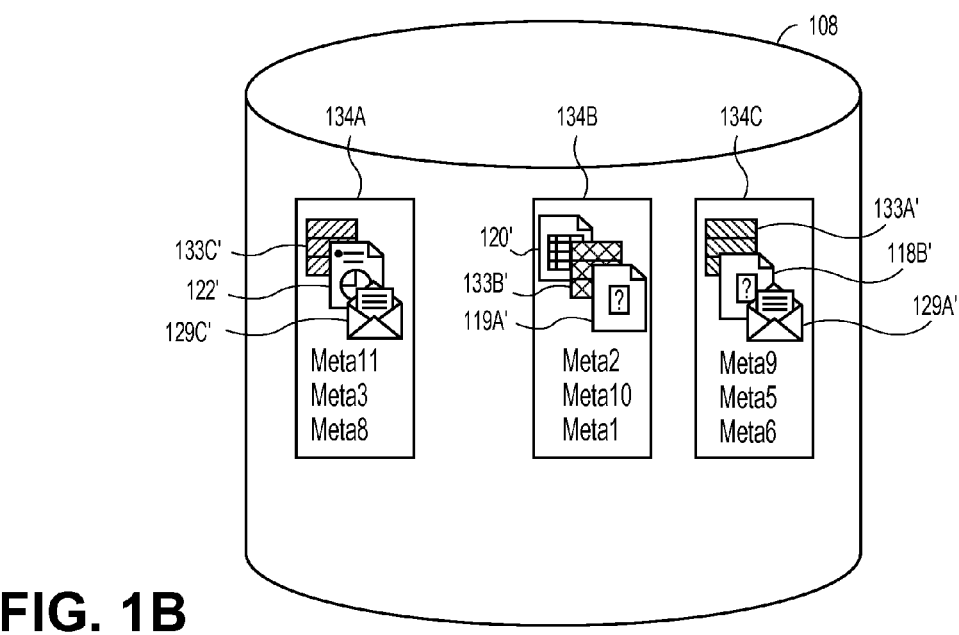

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
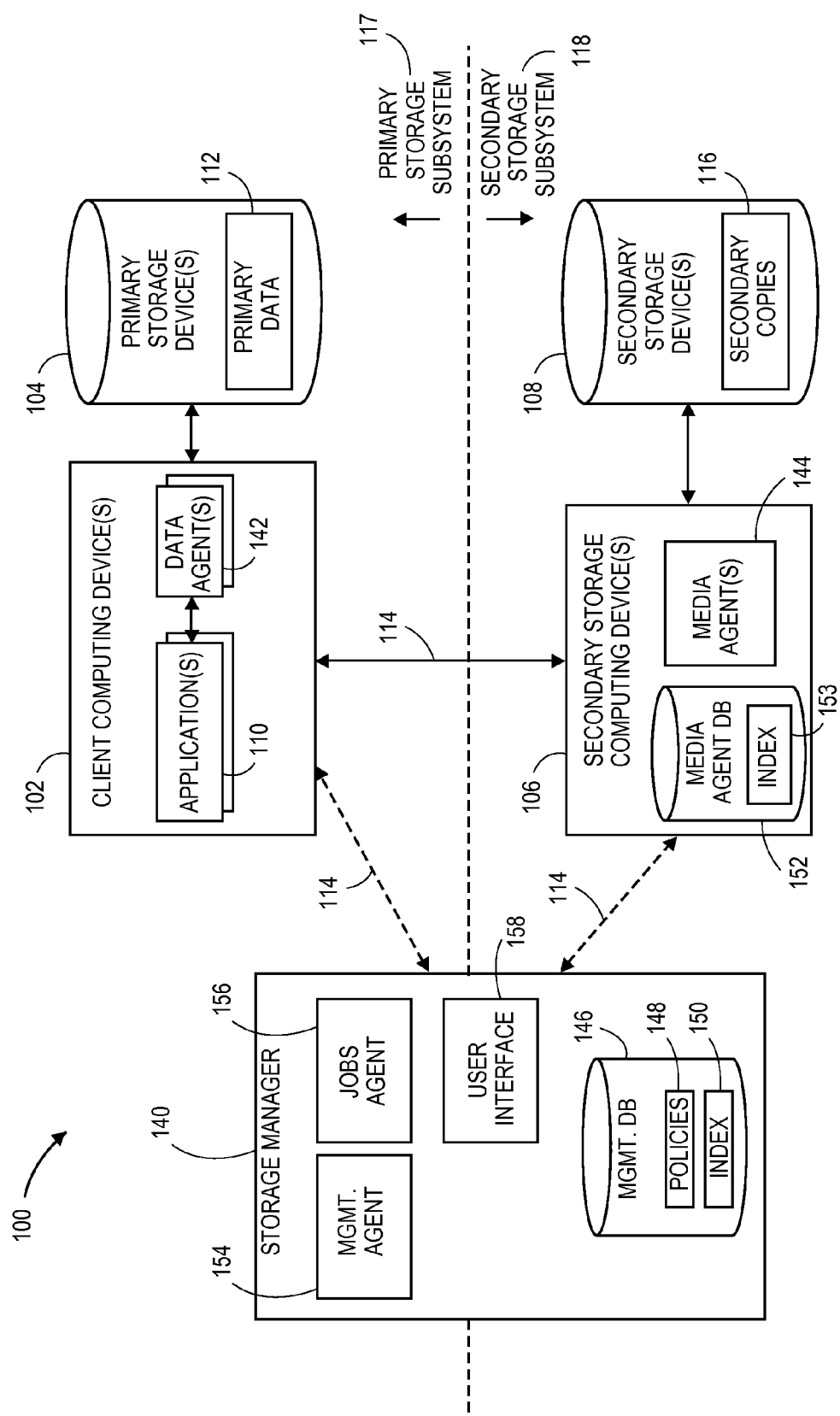
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
  initiating execution of secondary copy operations;
  managing secondary storage devices 108 and inventory/capacity of the same;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 by even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
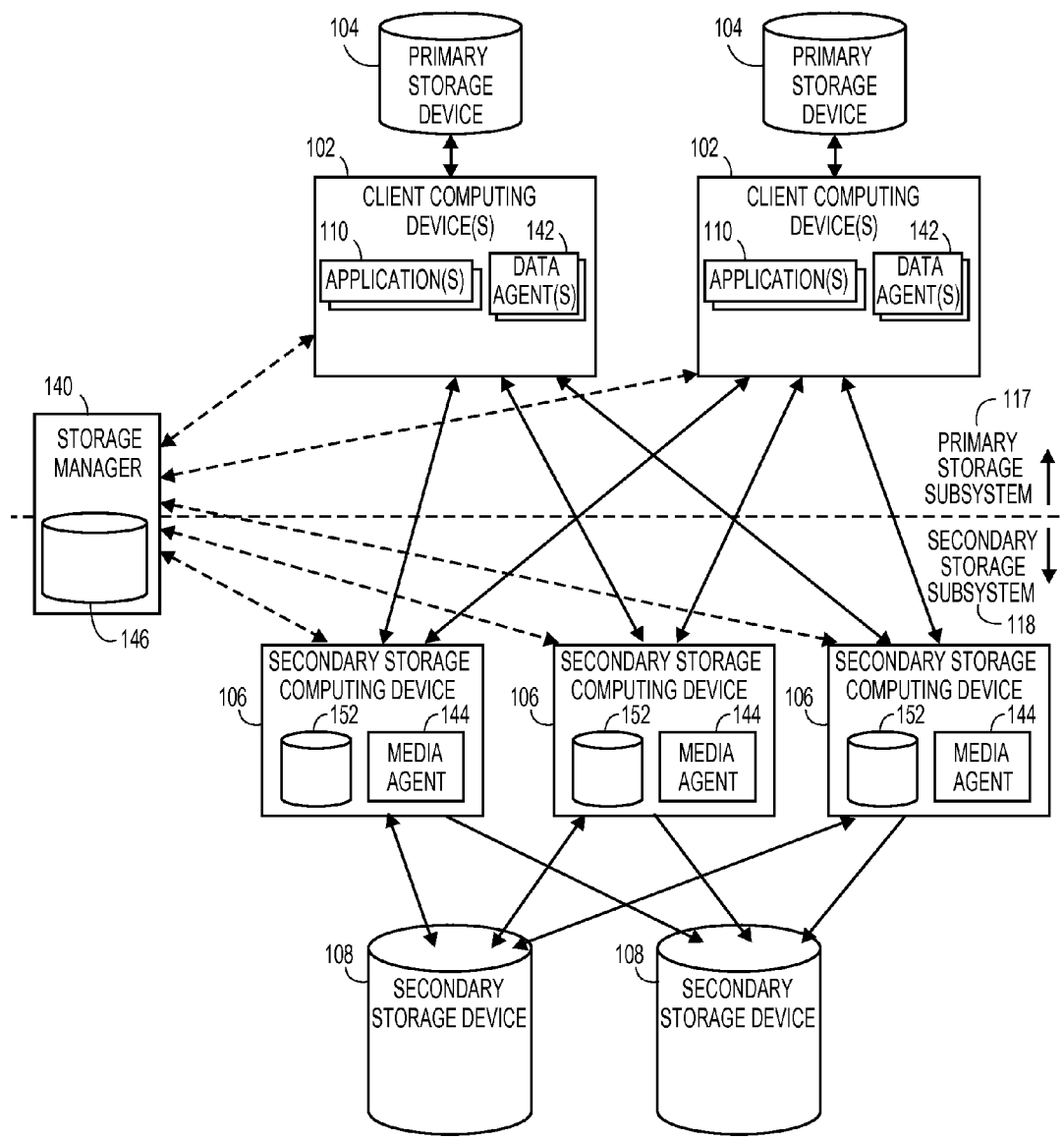
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
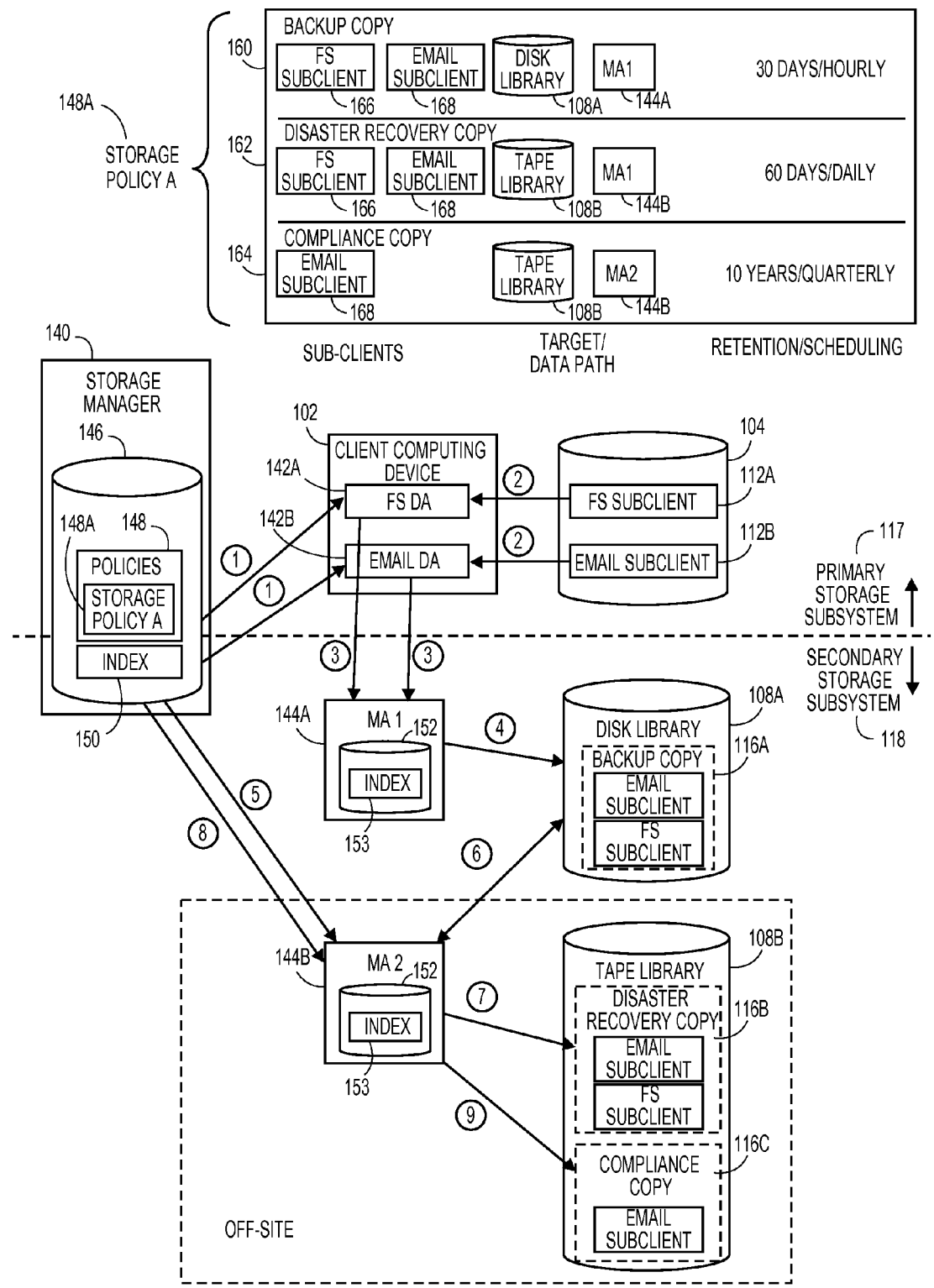
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

System Overview

The systems and methods described with respect to FIGS. 1A-1E can be used to implement automated retention policy. In some embodiments, a tiered retention module is a software module that forms a part of or resides on the storage manager 140 or, alternatively, the media agents 144. The tiered retention module can additionally be a software module executing on one or more of the client computers 102. In some embodiments, the tiered retention module may be implemented as a part of the data agent 142. Automated retention policies will now be discussed in more detail with respect to FIGS. 2-5.

Figure 2:
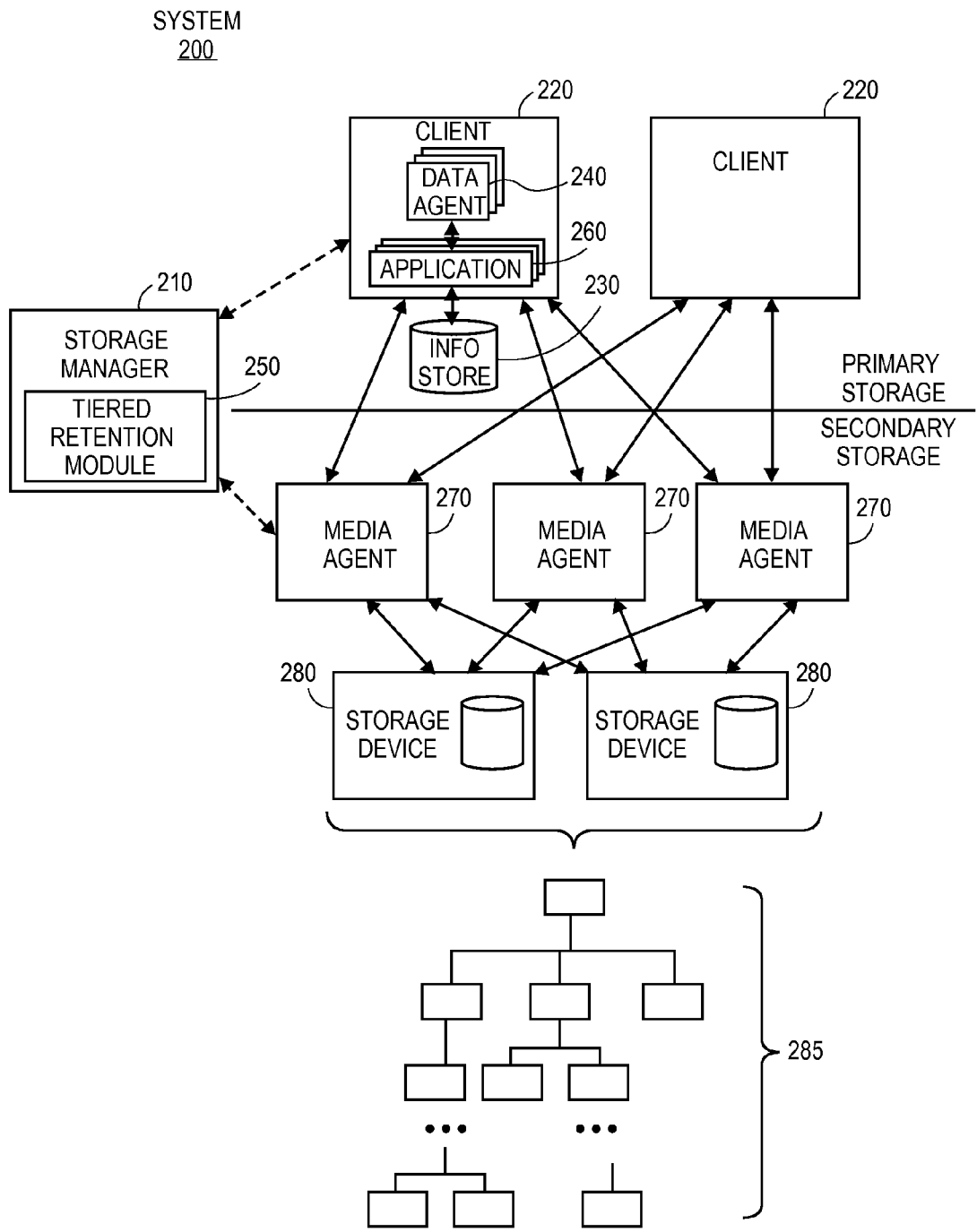
FIG. 2 is a block diagram of an exemplary storage system configured to implement automatic, tiered retention of user data according to certain embodiments.

FIG. 2 illustrates a block diagram of an exemplary network storage architecture compatible with embodiments described herein. The system 200 is configured to perform storage operations on electronic data in a computer network. As shown, the system 200 includes a storage manager 210 and one or more of the following: a client 220, an information store 230, a data agent 240, a tiered retention module 250, a media agent 270, and a storage device 280.

The system 200 and corresponding components of FIG. 2 may be similar to or the same as the system 100 and similarly named components of FIG. 1D. Moreover, depending on the embodiment, the system 200 of FIG. 2 may additionally include any of the other components shown in FIG. 1D that are not specifically shown in FIG. 2 (e.g., one or more storage manager databases, one or more media agent databases, one or more storage manager indexes, one or more media agent indexes, etc.). The system 200 may include one or more of each component. All components of the system 200 can be in direct communication with each other or communicate indirectly via the client 220, the storage manager 210, the media agent 270, or the like. In certain embodiments, some of the components in FIG. 2 shown as separate components can reside on a single computing device, or vice versa. For example, the tiered retention module 250 can be on the storage manager 210 or on a separate computing device.

An automatic, tiered retention module 250 generally manages and classifies data in the information store 230 and/or the storage devices 280 according to a user-defined (or pre-defined) policy for retention in different buckets within the storage system 200. As will be described in greater detail herein, the buckets can be logically organized in a hierarchy. Moreover, the bucket hierarchy 285 can be physically distributed across the various memory components in the storage system 200. For instance, the buckets 285 can be implemented in one or more of the secondary storage devices 280. In some embodiments, the tiered retention module 250 is a software module that forms a part of or resides on the storage manager 110 or, alternatively, the media agents 270. The tiered retention module 250 can additionally be a software module executing on one or more of the client computers 220. In some embodiments, the tiered retention module 250 may be implemented as a part of the data agent 240. The tiered retention module 250 will be discussed in more detail with respect to FIGS. 3-5.

An Example Automatic, Tiered Retention Data Storage System

Figure 3A:
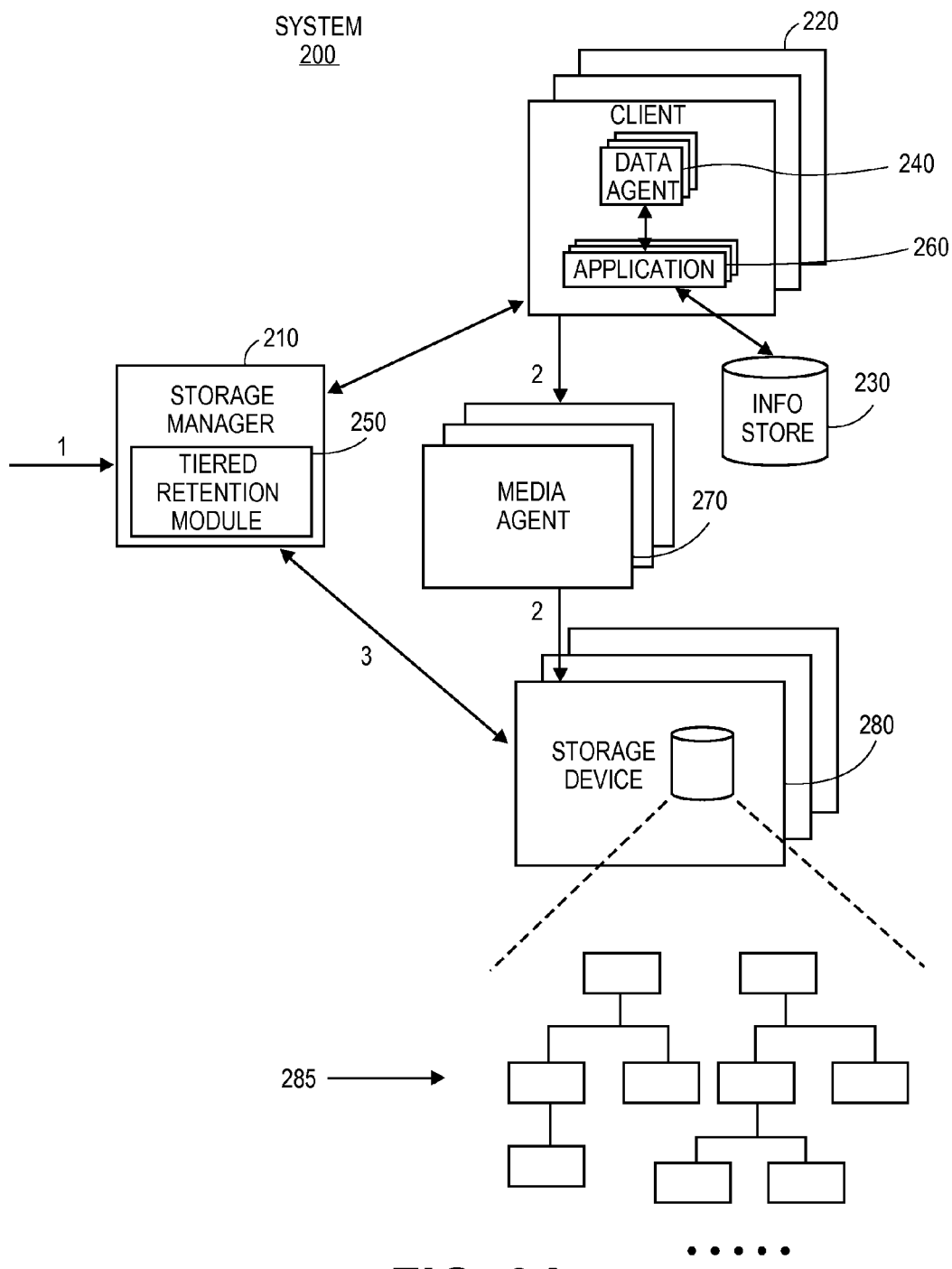
FIG. 3A is a data flow diagram illustrative of the interaction between the various components of an exemplary storage system configured to implement automatic, tiered retention according to certain embodiments.

FIG. 3A is a data flow diagram illustrative of the interaction between the various components of an exemplary storage system 200 configured to implement automatic, tiered retention according to certain embodiments. As illustrated, the example tiered retention system 200 includes a storage manager 210, one or more clients 220, an information store 230, one or more data agents 240, a tiered retention module 250, one or more applications 260, one or more media agents 270, and one or more storage devices 280. Although not shown, there may be a different information store 230 associated with each of the clients 220. As shown in FIG. 2, one or more clients 220 may communicate with one or more media agents 270, and one or more media agents 270 may communicate with one or more storage devices 280.

The system 200 and corresponding components of FIG. 3A may be similar to or the same as the system 100, 200 and similarly named components of FIGS. 1D and 2. Moreover, depending on the embodiment, the system 200 of FIG. 3A may additionally include any of the other components shown in FIG. 2 that are not specifically shown in FIG. 3A (e.g., one or more information stores, etc.). The system 200 may include one or more of each component. All components of the system 200 can be in direct communication with each other or communicate indirectly via the client 220, the storage manager 210, the media agent, or the like. In certain embodiments, some of the components in FIG. 3A shown as separate components can reside on a single computing device, or vice versa. For example, the tiered retention module 250 can be on the storage manager 210 or on a separate computing device.

With further reference to FIG. 3A, the interaction between the various components of the automatic, tiered retention system will now be described in greater detail with respect to data flow steps indicated by the numbered arrows.

At data flow step 1, a tiered retention storage policy is received by the storage manager 210. The policy can be defined by a system administrator or another user. Alternatively, the policy can be preconfigured in the storage manager 210. For instance, the storage manager 210 may access a default tiered retention policy if it does not receive one from the user or other entity.

The tiered retention storage policy includes criteria for automatically classifying data, such as user data stored in the info store 230 and/or in the storage devices 280. The classification criteria can depend on the user's specific requirements, and the user can define it accordingly. Details regarding automatic classification will be discussed below in connection with data flow step 3.

At data flow step 2, data in the information store 230 is copied to the storage devices 280. While described with respect to a backup copy operation for the purposes of illustration, the techniques described herein are compatible with other types of storage operations, such as, for example, replication, snapshots, archiving and the like. A description of some storage operations compatible with embodiments described herein is provided above. The data agents 240 can initiate the backup of data through the media agents 270, and the media agents 270 migrate or otherwise copy the data to the storage devices 280. One or more data agents 240 may communicate with one or more media agent 270, and one or more media agents 270 may communicate with one or more storage device 280. In certain embodiments, the data migrated to the storage devices 280 is initially placed in the default tier in the storage devices 280, which may be associated with a default retention (e.g., relatively short) period.

At data flow step 3, the tiered retention module 250 monitors data in the storage devices 280, and, based on the results of the monitoring, automatically classifies the data according to the tiered retention policy. Data in the storage devices 280 may be analyzed at any granularity. For instance, the data can organized and/or processed as files (e.g., emails, Microsoft Office documents, media files, etc.), pages, which may span more than one file, data blocks, which may correspond to portions of files, or in any other appropriate fashion.

The retention policy may specify that the tiered retention module 250 applies the retention policy (e.g., classifies, copies and/or prunes the data) according to a desired schedule. For example, the system 200 may repeatedly apply the retention policy (e.g., classify, copy and/or prune the data) after the passage of a pre-determined amount of time, such as on a regular basis (e.g., after a particular time interval, such as a certain number of hours or days), or on an intermittent basis. In some embodiments, the schedule dictates that the tiered retention module 250 classifies and assigns data to appropriate buckets incrementally, as the data is added to the system. In this manner, the classification and/or pruning can be applied to data as it is stored (e.g., onto the secondary storage devices 280). As an example, the scheduling policy can dictate that the tiered retention module 250 classify and or copy the data upon receipt of a pre-determined amount of new data, such as where a pre-determined amount of new backup data is stored on the storage devices 280. In this case, classification into buckets may occur on newly stored data only after receiving a threshold amount of new data since the last incremental application of the classification process. By classifying the data in increments, new data items can be sorted efficiently without having to re-sort old data items. In some cases, the policy can comprise a combination of time-based and incremental approaches. For instance, in one embodiment, only newly stored data is classified into buckets, while substantially all of the data is analyzed for pruning. Even where classification generally occurs only on incremental data, upon implementation of a new retention policy, substantially all of the data may be initially classified into buckets in order to recalibrate according to the new policy. In general, selection of an appropriate scheduling policy reduces manual processing by administrators, saving resources.

Based on the tiered retention policy, the tiered retention module 250 can classify data based on a wide variety of parameters, including content of the data, metadata associated with the data, or any other appropriate characteristic or attribute of the data.

In one embodiment, the tiered retention module 250 searches through the data based on certain (e.g., user-specified) search terms and classifies the data based on the results of the search. For instance, where the data is organized in a plurality of files, the user specifies certain search terms, and the tiered retention module 250 searches through the content of the files, metadata associated with the files, or both. The search can be a semantic search, concept search, or any other type of enhanced search.

Where the files comprise emails, for example, the policy can classify data according to email content, subject matter as indicated by content and/or metadata, or parameters related to email. Email parameters can include mailbox owner, sender, receiver, date, etc. As an example, a corporation may define a tiered retention policy which dictates that emails relating to financial documents are retained by the storage system 200 for a certain number of years, based on subject matter (e.g., subject matter of content and/or metadata could indicate that the email is associated with the accounting department of an organization). As another example, a retention policy may also dictate that emails sent to and/or received from a certain employee (e.g., the CEO) are stored for a particular number of years. The tiered retention module 250 can identify such emails based on metadata indicating the mailbox owner, the sender or recipient email address, or some other appropriate means.

Multiple metadata properties may be used together, and metadata properties could be used in conjunction with content. Metadata may be stored in a metabase, as described in greater detail in application Ser. No. 11/563,940, now U.S. Pat. No. 7,747,579, issued Jun. 29, 2010, herein incorporated by reference in its entirety.

Some example scenarios where the automatic classification described herein may be particularly useful include the following:

A pharmaceutical company wants to track all emails discussing a particular drug. The classification can be, for example, based on a search of the subject matter or on a search of the email content. All emails that are included in the search results are retained for 7 years.

A corporation wants to retain all documents created or modified in January 2012 for 5 years. The classification can be based on metadata properties like time of creation or modification.

A company wants to keep all emails sent by the CEO for a period of 5 years. The classification may be based on the sender's email address.

The data that is classified according to a particular retention policy is assigned to a corresponding "bucket" in the storage system 200. As used herein, the term "bucket" can refer to a data storage container having a particular set of retention parameters associated with it. Retention parameters can include, without limitation (1) a retention period defining a length of time data included in a particular bucket is kept until the data is pruned or otherwise deleted from the bucket, (2) a storage class or type (e.g., primary backup, secondary backup, archive, a particular tier in a hierarchical storage management system, etc.), (3) a type of media associated with the bucket (e.g., magnetic drive, tape drive, solid-state drive, etc.

Moreover, buckets can be delineated logically, physically, or a combination thereof. For example, a first set of one or more of the buckets 285 may reside logically and physically on a first one of the storage devices 280, a second set of one or more of the buckets 285 may reside on a second one of the storage devices 280, and so on. In other cases, one or more of the buckets 285 may comprise a single logical entity, but is distributed across more than one of the storage devices 280. In yet further configurations, one or more of the storage devices 280 correspond to a single bucket. In another embodiment, the buckets are delineated by storage device type, and storage devices having a first type correspond to a first bucket or set of buckets, storage devices having a second type correspond to a second bucket or set of buckets, etc.

The retention period for the buckets can vary (e.g., 1, 2, 5, 10 or more hours, days or years). Moreover, the retention period can correspond to the length of time the data will be kept after it is placed in the bucket, to the length of time the data will be kept after it was originally created by an application 260 on the client 220 or stored in the client information store 230, or to some other appropriate duration. After the time period expires, the tiered retention module 250 prunes the data from the particular bucket. For instance, the data may be pruned at the next scheduled application of the pruning logic according to the retention policy. The time period can be set by the user (e.g., at data flow step 1) in some cases, or can be part of a pre-determined retention policy. In some cases, the tiered retention module 250 sets the retention period based on some other characteristic associated with the particular bucket. For example, the retention period can be based on the type of data associated with the bucket (e.g., emails, finance or accounting related files, etc.), the type of media associated with the bucket, and the like. In other embodiments, a default retention period is used.

Buckets may also be defined based on criteria for adding data to a bucket instead of or in addition to retention period. For instance, buckets may be associated with particular content and metadata.

As shown in FIG. 3A, the buckets 285 may be organized in a hierarchy in certain cases. For example, "parent" buckets at a first level in the hierarchy can each be further broken down into "child" buckets at lower levels in the hierarchy. And the files (or other data) can be assigned to the various buckets based on content, metadata, etc. For example, child buckets may generally have longer associated retention periods than the parent bucket from which they depend.

As an illustration, the retention policy may dictate that all user-generated files associated with employees of a pharmaceutical company be placed in a parent bucket having a 3-year retention period. The policy may further dictate that certain ones of the user-generated files be further allocated amongst a plurality of child buckets having different (e.g., longer) retention periods than the parent bucket. For instance, any emails associated with a particular employee of an organization (e.g., the Chief Executive Officer ("CEO") or Chief Technical Officer ("CTO")) may be assigned to a first child bucket having a 7-year retention period. The tiered retention module 250 may assign to the first child bucket any emails in that particular employee's inbox, that were sent by that employee, that were received by that employee, etc. Another child bucket having a 5-year retention period may include any documents related to or referencing a particular brand or type of medicine. Child buckets are described in greater detail below with respect to FIG. 5.

The parent bucket in certain embodiments includes all data in the child bucket, and logically, the child bucket can therefore be a subset of the parent bucket. In one embodiment, the parent bucket and the child bucket each maintain separate copies of their respective data items. In another embodiment, only a single copy of the data item exists for the parent bucket and the child bucket, and the copy is not pruned until after the longer of the parent and child retention periods expires. For instance, when the shorter of the parent and child retention periods expires, the tiered retention module 250 may determine whether or not the data belongs to another bucket before pruning the data. And, upon determining that the data belongs to a bucket having an unexpired retention period, the tiered retention module 250 decides not to prune that particular data item.

As mentioned above, the storage devices 280 include one or more buckets 285 that are each associated with a particular classification and have different retention periods. And the buckets 285 in the storage devices 280 can each have separate copies of data belonging to them. For example, if an email belongs in both the 3-year bucket and the 5-year bucket, each bucket has a copy of the email so that the different buckets can operate and be managed substantially independently of other buckets. In one embodiment, the copies of at least some of the data items are pointers to the actual data. For instance, where deduplication technology is used, the data items may comprise pointers to deduplicated data blocks. In other embodiments, each bucket has actual copies of all of the data items rather than pointers. Particularly where the buckets retain their own copies of the respective data items, the tiered retention module 250 can treat the buckets independently, which can simplify processing. For instance, in such cases the system 200 can simply prune data items from a bucket upon expiration of the retention period, even if the same data item exists in another bucket. Thus, the copy of the data in a bucket with a shorter retention period is removed from that bucket upon expiration of the retention period even if that data item it is also included in a bucket with a longer retention period.

After the data is migrated to the corresponding buckets 285 in the storage devices 280, the data may be content indexed to facilitate searching of the data. The content index may be a common content index for the buckets having the same retention period. For example, a bucket could include multiple buckets within it that are based on different classifications, such as CEO emails and financial documents, and the system 200 could have one content index for the entire bucket, instead of having a content index for each bucket. Alternatively, each bucket based on a classification could have a separate content index. In other embodiments, data is not content indexed, and a user can navigate through the data by browsing. For example, the user can read through all CEO emails without using a particular tool.

As described above, the entire process of classifying, storing and pruning data based on content and/or metadata may be automatic from the creation of the data item by the corresponding user application 260 to pruning of the data item from the system 200. In particular, the classification of data to store for different periods of time can be accomplished automatically. In this way, the amount of data a corporation or an organization needs to maintain can be dramatically reduced and become more manageable. Moreover, the automated nature of the process avoids the manual search process involved in some existing data retention solutions. This allows organizations to retain data in a manner that suits the needs of the organization while dedicating far fewer resources and expense to the data pruning process.

Figure 3B:
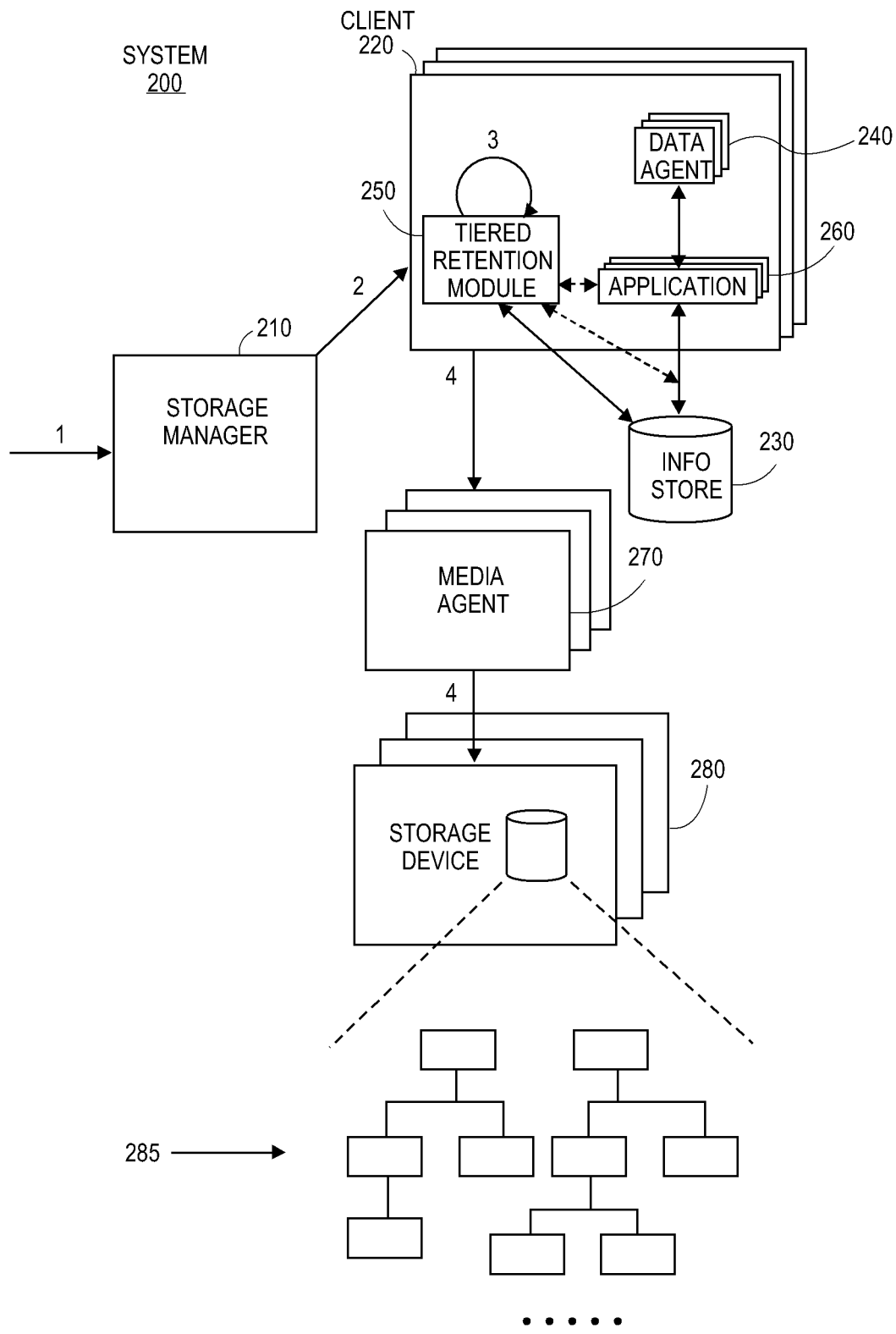
FIG. 3B is a data flow diagram illustrative of the interaction between the various components of another exemplary storage system configured to implement automatic, tiered retention according to certain embodiments.

FIG. 3B is a data flow diagram illustrative of the interaction between the various components of an exemplary storage system 200 configured to implement automatic, tiered retention according to other embodiments. In contrast to the arrangement shown in FIG. 3A, in the embodiment shown in FIG. 3B, the tiered retention module 250 resides on one or more of the clients 220.

At data flow step 1, the storage manager 210 accesses the tiered retention policy. For instance, the tiered retention policies may be preconfigured policies that are stored in the storage manager 210, or may be received by the storage manager 210 (e.g., via user input), as explained with respect to FIG. 3A.

At data flow step 2, the storage manager 210 transmits the retention policies and rules to the client(s) 220. In other embodiments, the policy is input at the client 220. Where there are multiple clients, the policies can be the same across all clients, or can instead be client-specific and differ depending on the client.

As previously mentioned, the tiered retention module 250 may be a software module that resides on the client 220 or on a separate computing device. If on the client 220, the tiered retention module 250 can be a standalone module or can be a part of the data agent 240.

At data flow step 3, the tiered retention module 250 monitors data generated by the applications 260, and, based on the results of the monitoring, automatically classifies the data according to the tiered retention policy. In some cases, the tiered retention module 250 monitors the data after the data has been stored in the information store 230. For instance, the tiered retention module 250 may access the data from the information store 230 and process the data according to the retention policy. In other cases, the tiered retention module 250 monitors the data before it is actually stored in the information store 230. For instance, the tiered retention module 250 may perform a snooping function to intercept communications between the application(s) 260 and the information store 230. In this manner, the tiered retention module 250 can process the intercepted data without actually reading from the information store 230. In yet other configurations, the tiered retention module 250 obtains the data directly from the applications 260.

The data in the information store 230 may be content indexed as it enters the system. Alternatively, the content indexing may be done at a later time.

At data flow step 4, the classified data is copied to the corresponding bucket in the storage system 200. For instance, the data agent 240 can initiate the backup of data through media agents 270, which then conduct the data to the storage devices 280. Or the tiered retention module 250 may interact with the media agents 270 and/or data agents to migrate the data to the buckets 285. While described with respect to a backup copy operation for the purposes of illustration, the techniques described herein are compatible with other types of storage operations, such as, for example, replication, snapshots, archiving and the like. A description of some storage operations compatible with embodiments described herein is provided above.

Figure 4:
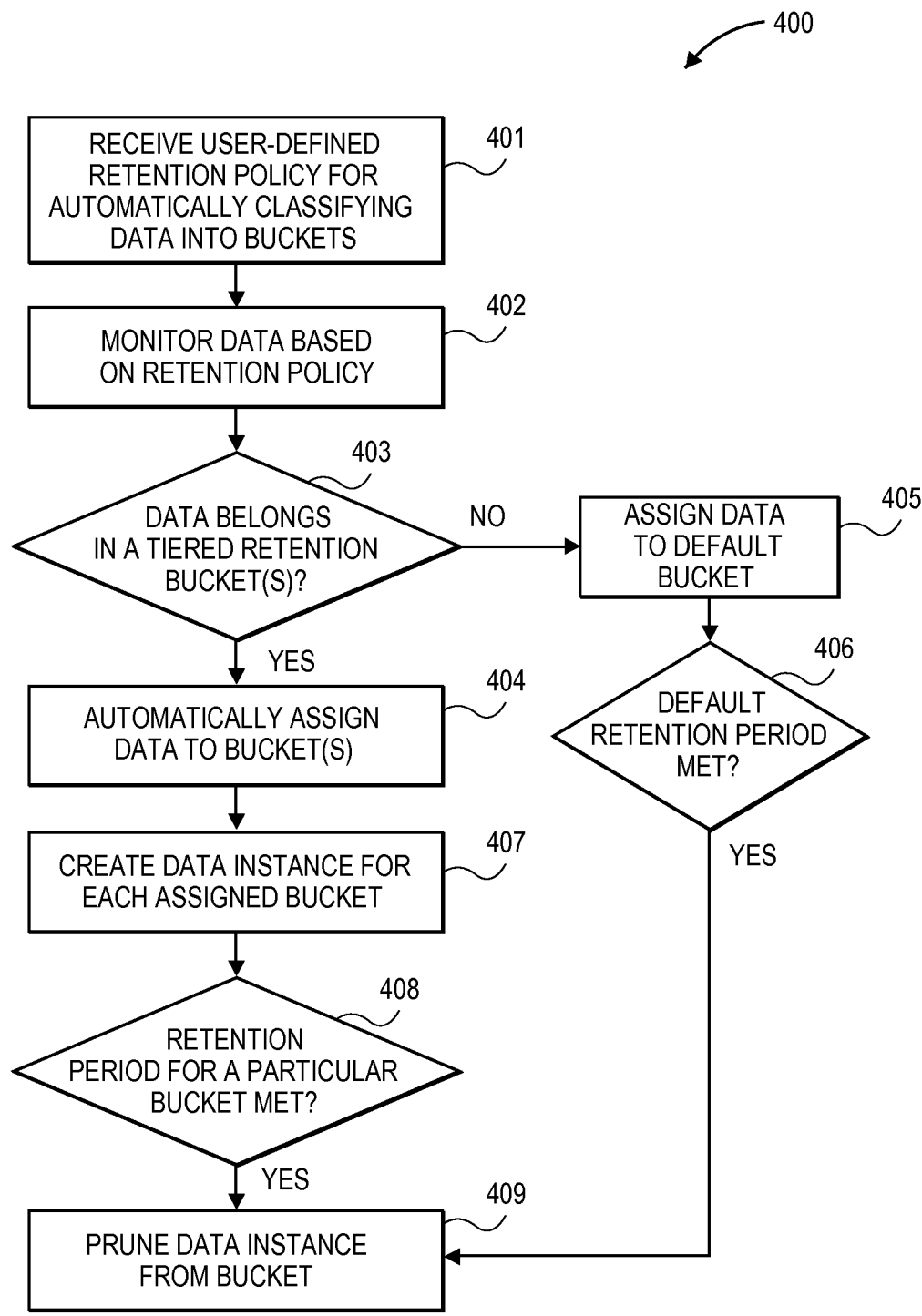
FIG. 4 is a flow diagram illustrative of one embodiment of a routine for automatically classifying data and copying the data to various buckets.

FIG. 4 is a flow diagram illustrative of one embodiment of a routine 400 implemented by an automatic, tiered retention storage system for implementing an automatic retention policy. The routine 400 is described with respect to the system 200 of FIG. 3A. However, one or more of the steps of routine 400 may be implemented by other tiered retention storage systems, such as those described in greater detail above with reference to FIGS. 2 and 3B. The routine 400 can be implemented by any one, or a combination of, a client, a storage manager, a data agent, a tiered retention module, a media agent, and the like. Moreover, further details regarding certain aspects of at least some of steps of the routine 400 are described in greater detail above with reference to FIGS. 3A and 3B. Although described in relation to backup operations for the purposes of illustration, the process of FIG. 4 can be compatible with other types of storage operations, such as, for example, migration, snapshots, replication operations, and the like.

At block 401, the system administrator or user creates a tiered retention policy to automatically classify data to be stored retained in a bucket, and the policy is received by the storage manager. Alternatively, the policies could be preconfigured and preloaded in the storage manager. For instance, a default policy may reside at the storage manager and be used if a user-defined storage policy is not received.

At block 402, the tiered retention module 250 according to some embodiments processes the data in the storage devices 280 and determines whether the data should be placed in a particular bucket according to the tiered retention policy. As discussed above, the processing of block 402 can occur according to a scheduling policy, such as at a pre-determined time increments (e.g., a pre-determined number of hours, days, etc.). Or the processing can occur based on some other triggering event, such as when a new tiered retention policy is activated, or after a threshold amount of new, unclassified data is migrated to the storage devices 280 which has not yet been classified by the tiered retention module 250.

In other embodiments, such as in the configuration of FIG. 2B, the tiered retention module 250 resides on one or more clients, and the tiered retention module monitors the data in the information store 230. The tiered retention module 250 may monitor the data after it has been saved to the information store, or before it is saved to the information store (e.g., by performing a snooping function).

If the tiered retention module determines that certain data belongs in a tiered retention bucket(s), as shown in block 403, the data is automatically assigned to the corresponding bucket (s), as shown in block 404. In some embodiments, if the data does not belong in a particular bucket, the data is assigned to a default bucket, as shown in block 405. Once the data is assigned to a particular bucket (or buckets) at block 404, an instance of the data is created for each assigned bucket, as shown in block 407. In other embodiments, where a data item belongs to more than one bucket, only one physical copy of the data item is retained, and a pointer or other logical reference to the data item is retained for at least some of the buckets including the data item.

If it is determined that the retention period for a specific bucket is met, as shown in block 408, the data instance in the bucket is pruned from the bucket at block 409. If data was assigned to the default bucket at block 405, the data instance for the data item is pruned at block 409 if the default retention period is met, as shown in block 406. If all the data in the bucket is pruned, the bucket itself may be deleted.

The routine 400 can include fewer, more, or different blocks than those illustrated in FIG. 4 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Figure 5:
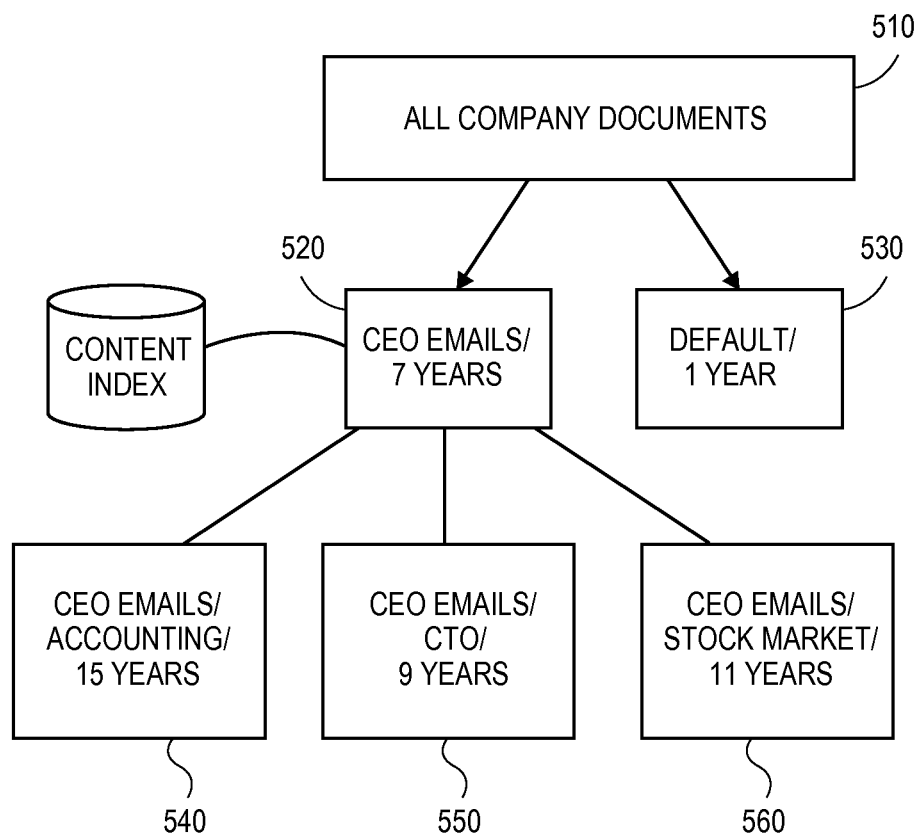
FIG. 5 is a schematic diagram illustrating an exemplary logical view of a hierarchy of buckets within a storage system that implements automatic, tiered retention, according to some embodiments.

FIG. 5 is a schematic diagram illustrating a specific example of a data storage system implementing a tiered retention policy defining a particular retention hierarchy 500 including a plurality of buckets 520-560. For example, the tiered retention hierarchy 500 shown in FIG. 5 may be implemented by any the data storage systems described with respect to FIGS. 2 and 3, or by some other data storage system.

In the example illustrated in FIG. 5, out of all company documents 510, Corporation A decides to store all CEO emails for 7 years. A system administrator or a user defines a tiered retention policy so that all emails with the CEO as the mailbox owner are stored for a term of at least 7 years. Thus, the policy dictates that all emails having metadata indicating that the CEO is the mailbox owner is assigned to a "7-year" bucket 520 having a retention period of 7 years. The tiered retention module 250 monitors data in the storage devices 280 according to the tiered retention policy (e.g., according to a time based schedule) and determines whether there are any data items to assign to the 7-year bucket 520 defined by the policy. If certain emails meet the criteria for the 7-year bucket 520, they are classified as CEO emails to retain for 7 years and assigned to the 7-year bucket 520.

According to the policy above, all CEO emails are stored in the 7-year bucket 520. However, even CEO emails may not all be of equal importance. Therefore, a multi-tiered retention scheme may be defined for CEO emails. For example, the company may want to keep CEO emails discussing accounting matters for a longer period, such as 15 years. Thus, as one example, the tiered retention policy defines a further classification criteria (in addition to the mailbox owner (CEO)) including a search term (e.g., the term "accounting" with or without other related words). Where one or more search terms are used as a part of the classification criteria, the search term criteria is met if the tiered retention module 250 finds the data item content and/or metadata. Thus, the tiered retention module 250 would search through the emails and the classification criteria would be met for emails where the mailbox owner is the CEO and where the search term "accounting" is included in the email content and/or metadata. A corresponding "15-year" bucket 540 is created in the storage devices 280, and the emails belonging to the 15-year bucket 540 defined by this policy are migrated to the 15-year bucket 540.

Emails that are addressed to a particular individual may have unique importance. Thus, the CEO's emails to the CTO could be stored in yet another, "9-year" bucket 550 with a 9-year retention period. Accordingly, for the 9-year bucket 550, the classification criteria would dictate that e-mails having the CEO as the mailbox owner and the CTO as the email recipient are placed in the 9-year bucket 550. As another example, the policy could assign CEO emails relating to the stock market to yet another different bucket 560 with an 11-year retention term. Finally, data not belonging to any particular bucket is stored in a default bucket 530, for example, with a 1-year retention period.

Because all buckets may operate independently of one another, even though certain emails would be included in multiple buckets in the above example, each bucket would maintain a pointer to or a copy of the data. That is, certain emails belonging to both the 7-year bucket 520 and 15-year bucket 540 would not, by virtue of being included in the 15-year bucket 540, be removed from the 7-year bucket 520 at the time they are added to the 15-year bucket 540. The 7-year bucket 520 and the 15-year bucket 540 would each have its own copy of the data in some form (i.e., pointer or actual copy) so that the data can be pruned from the bucket when the retention period is up without regard to whether the data is included in other buckets or not.

As shown in FIG. 5, the data stored in the various buckets may be content indexed to allow users to search the data. Data items sharing a same parent bucket could share a common content index. For instance, any of the 15-year, 9-year, and 11-year buckets 540, 550, and 560, which are child buckets of the 7-year bucket 520 in the bucket hierarchy, would share a common content index. Alternatively, the data in the buckets can be browsed without being content indexed.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method for automatic, tiered data retention in a networked data storage system, comprising:

copying primary data comprising a plurality of files generated by one or more client computers from primary storage to secondary storage;

accessing from computer storage a data retention policy including classification criteria associated with each of a plurality of buckets in the secondary storage having corresponding retention periods associated therewith, wherein individual files in the plurality of files belong to a particular bucket of the plurality of buckets if the individual files meet the classification criteria associated with the particular bucket;

using computer hardware of one or more computers, automatically accessing the plurality of files and processing, based on the data retention policy, the plurality of files to identify at least a first file of the plurality of files in the secondary storage to determine that the first file belongs to a first bucket of the plurality of buckets that is associated with a first retention period;

using computer hardware of one or more computers, automatically processing, based on the data retention policy, the first file of the plurality of files to determine that the first file also belongs to a second bucket of the plurality of buckets that is associated with a second retention period that is longer than the first retention period;

associating a first instance of the first file with the first bucket; and associating a second instance of the first file with the second bucket, wherein the first instance of the first file associated with the first bucket is scheduled for deletion according to the data retention policy after the first instance has been retained for at least a duration of the first retention period, and wherein the second instance of the first file associated with the second bucket is scheduled for deletion according to the data retention policy after the second instance has been retained for at least a duration of the second retention period.

2. The method of claim 1, further comprising:
retaining the first instance of the first file for at least the duration of the retention period associated with the first bucket; and
retaining the second instance of the first file for at least the duration of the retention period associated with the second bucket.

3. The method of claim 1, further comprising:
deleting the first instance of the first file in response to expiration of the retention period associated with the first bucket; and
deleting the second instance of the first file in response to expiration of the retention period associated with the second bucket.

4. The method of claim 1, wherein said associating the first instance of the first file with the first bucket comprises copying data from a first storage device to a second storage device to create the first instance.

5. The method of claim 1, wherein said first instance and said second instance are stored on the same storage device.

6. The method of claim 1, wherein the first and second instances comprise separate copies of the first file.

7. The method of claim 1, wherein at least one of the first and second instances comprise pointers to deduplicated versions of the first file or portions thereof.

8. The method of claim 1, wherein the classification criteria for the first bucket of the plurality of buckets dictates that the first file belongs to the first bucket at least in part based on metadata associated with the first file.

9. The method of claim 1, wherein the classification criteria for the first bucket of the plurality of buckets dictates that the first file belongs to the first bucket at least in part based on a determination that the first file includes at least one instance of a particular search term.

10. A data storage system for automatic, tiered data retention, comprising:
a computing system comprising one or more computing devices that include computer hardware, the computing system configured to:
initiate copying of primary data comprising a plurality of data items generated by one or more applications executing on one or more client computers from primary storage to secondary storage;
access from computer storage a data retention policy comprising a set of classification rules for classifying the files into a plurality of buckets in the secondary storage, each bucket associated with a particular retention period;
automatically access the plurality of files and process, based on the retention policy, the plurality of files to identify at least a first file of the plurality of files in the secondary storage to determine that the first file belongs to a first bucket of the plurality of buckets associated with a first retention period;
automatically process, based on the retention policy, the first file of the plurality of files to determine that the first file belongs to a second bucket of the plurality of buckets associated with a second retention period that is longer than the first retention period;
associate a first instance of the first file with the first bucket; and
associate a second instance of the first file with the second bucket,
wherein the first instance of the first file associated with the first bucket is scheduled for deletion according to the data retention policy after the first instance has been retained for at least a duration of the first retention period, and wherein the second instance of the first file associated with the second bucket is scheduled for deletion according to the data retention policy after the second instance has been retained for at least a duration of the second retention period.

11. The data storage system of claim 10, wherein the computing system is further configured to:
retain the first instance of the first file for at least the duration of the retention period associated with the first bucket; and
retain the second instance of the first file for at least the duration of the retention period associated with the second bucket.

12. The data storage system of claim 10, wherein the computing system is further configured to:
delete the first instance of the first file in response to expiration of the retention period associated with the first bucket; and
delete the second instance of the first file in response to expiration of the retention period associated with the second bucket.

13. The data storage system of claim 10, wherein the computing system is further configured to associate the first instance of the first file with the first bucket at least in part by copying data from a first storage device to a second storage device to create the first instance.

14. The data storage system of claim 10, wherein said first instance and said second instance are stored on the same storage device.

15. The data storage system of claim 10, wherein the first and second instances comprise separate copies of the first file.

16. The data storage system of claim 10, wherein at least one of the first and second instances comprise pointers to deduplicated versions of the first file or portions thereof.

17. The data storage system of claim 10, wherein the classification criteria for the first bucket of the plurality of buckets dictates that the first file belongs to the first bucket at least in part based on metadata associated with the first file.

18. The data storage system of claim 10, wherein the classification criteria for the first bucket of the plurality of buckets dictates that the first file belongs to the first bucket at least in part based on a determination that the first file includes at least one instance of a particular search term.

* * * * *